Nov. 24, 1964     D. HARRIS     3,157,998
HYDROSTATIC TRANSMISSION CONTROL

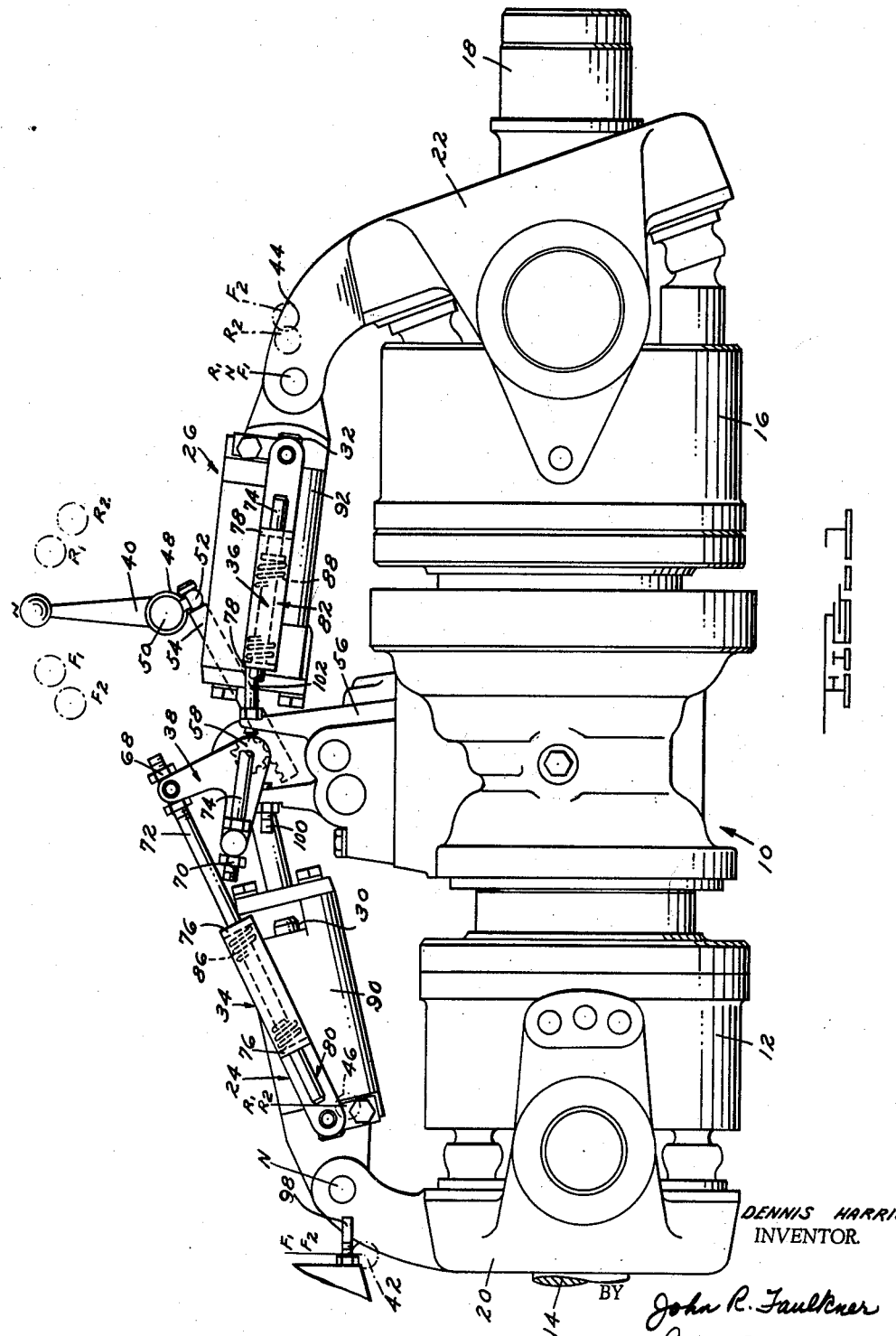

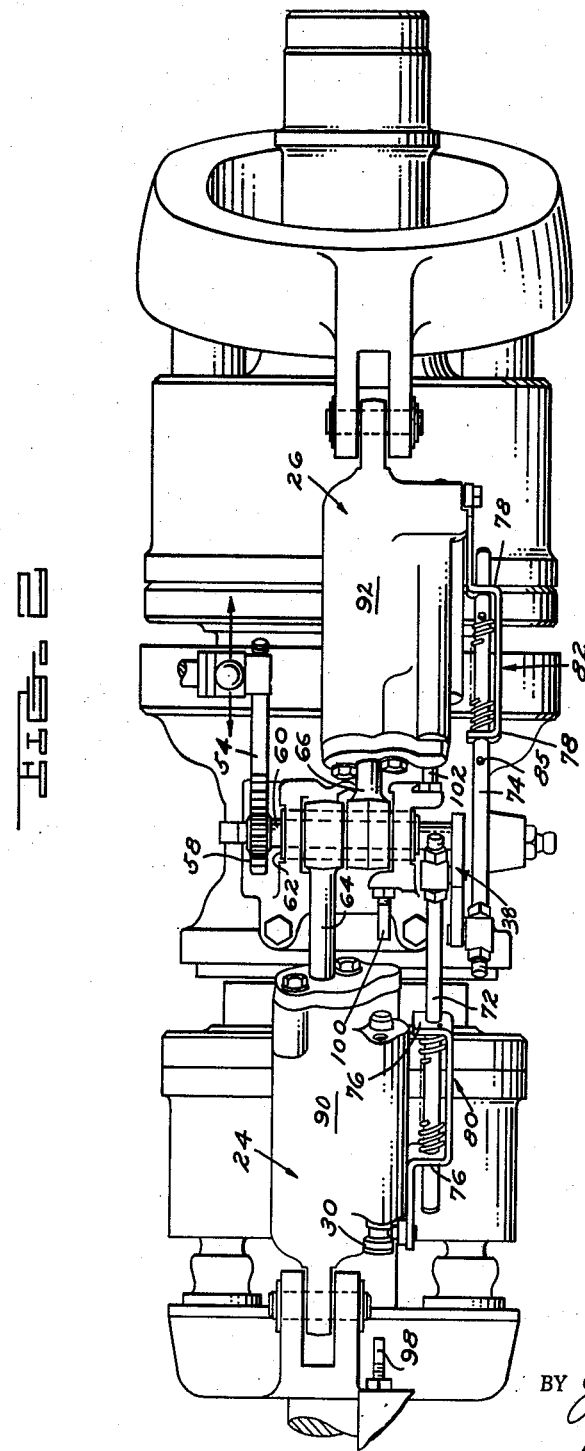

Filed Feb. 28, 1963     5 Sheets-Sheet 3

NEUTRAL

INTERMEDIATE
FORWARD DRIVE

DENNIS HARRIS
INVENTOR.

BY John R. Faulkner
Robert E. McCollum
ATTORNEYS

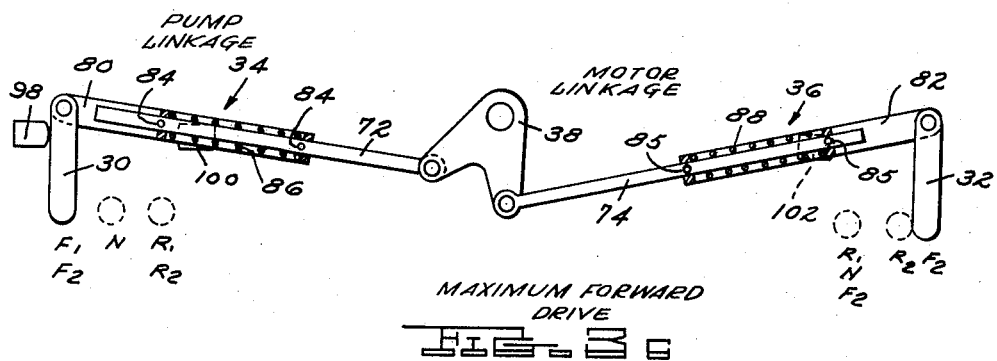
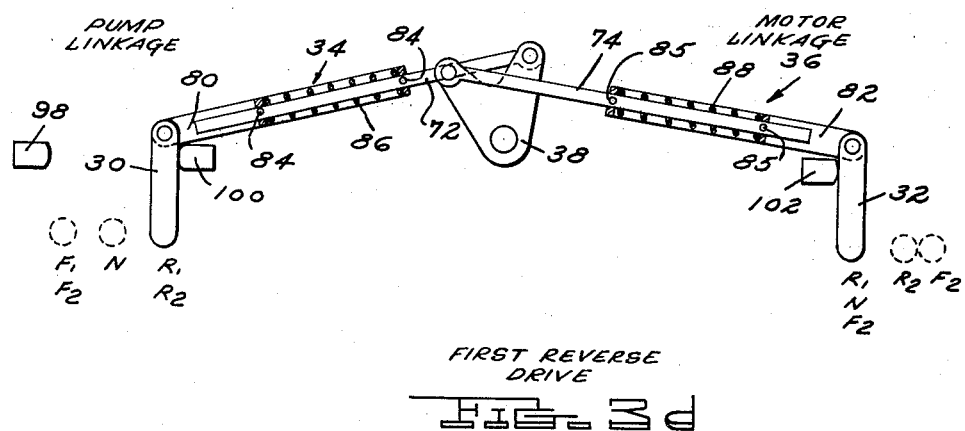
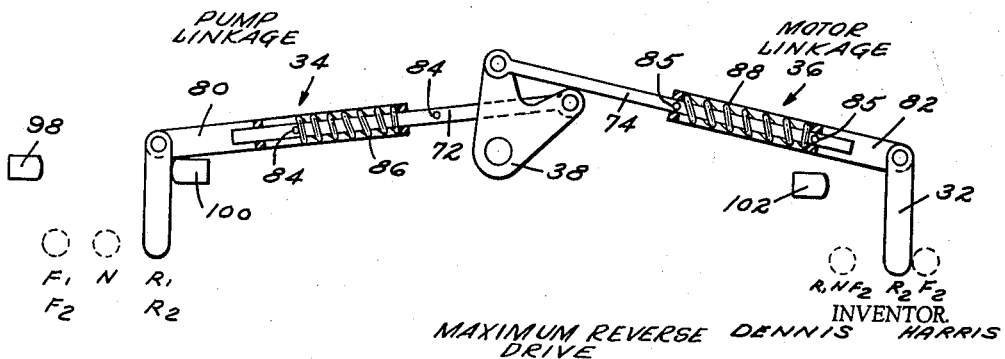

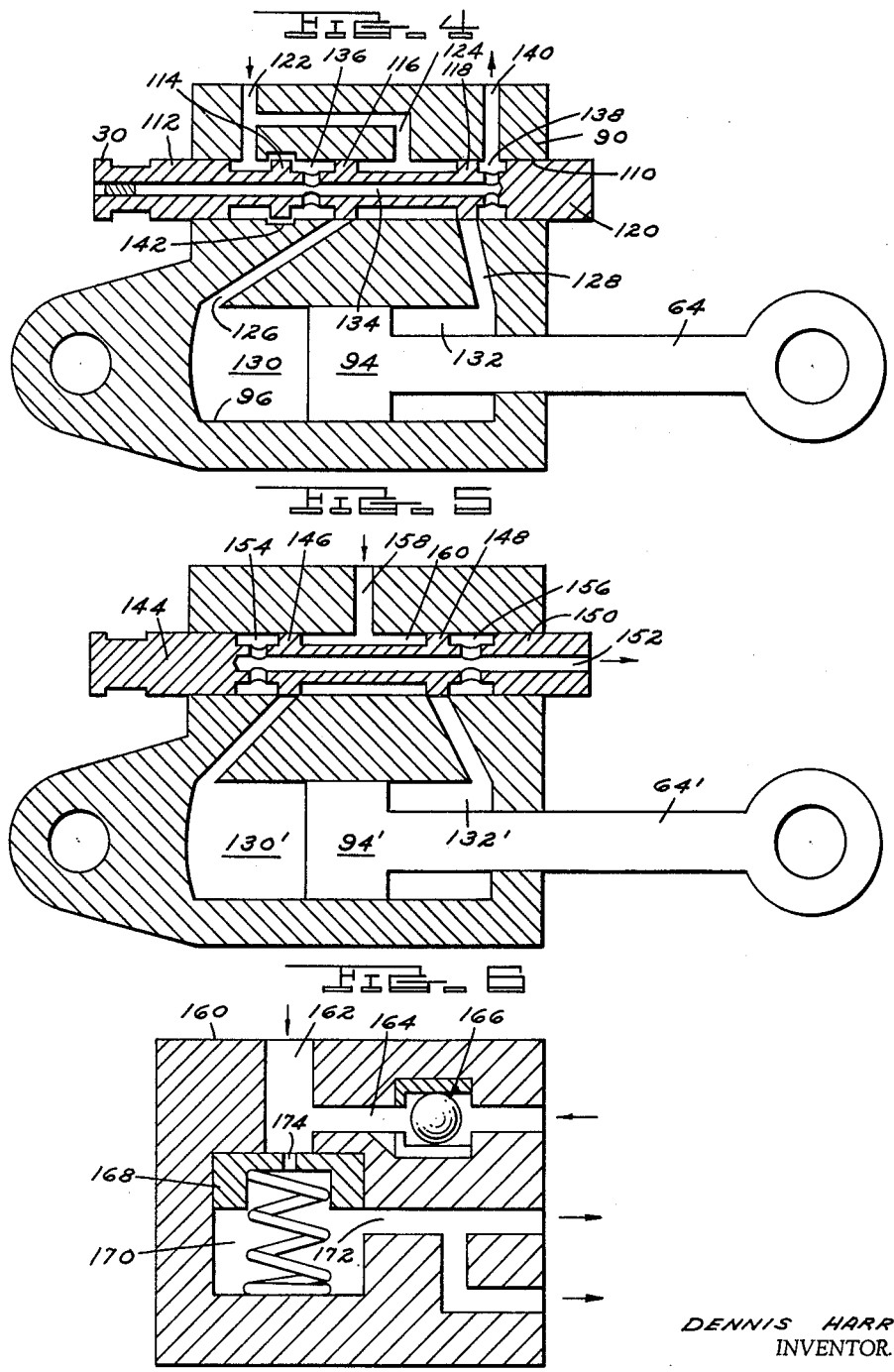

United States Patent Office 3,157,998
Patented Nov. 24, 1964

3,157,998
HYDROSTATIC TRANSMISSION CONTROL
Dennis Harris, Birmingham, England, assignor to Ford Motor Company, Dearborn, Mich., a corporation of Delaware
Filed Feb. 28, 1963, Ser. No. 261,681
Claims priority, application Great Britain, Mar. 19, 1962, 10,346/62
12 Claims. (Cl. 60—53)

This invention relates to control means for a variable displacement fluid pump and/or motor. More particularly, it relates to a control means for properly sequencing the tilting of the swash plates of a variable displacement pump and motor in a hydrostatic transmission without subjecting the control connections to excessive forces or loads.

A hydrostatic transmission of the type described above may have one or more variable displacement swash plate type pumps driving one or more similar type motors. The swash plates are tilted in proper sequence by a number of hydraulic servos operatively controlled through suitable valving and linkages by a manually operated drive ratio selector lever to provide an infinitely variable number of fluid drives through the transmission.

In order to obtain the proper sequencing of the movements of the different valve and servos, as well as ideal lever-to-servo movement ratios, the physical dimensions and other parameters of the linkages and/or other connections between the servo controls and the operating lever must be chosen with great care. Manufacturing and design criteria, however, sometimes impose severe limitations on this precise selection, with the result that, all too frequently, the control means obtained is one that requires careful operation to function properly. Thus, for example, too rapid movements of the manually operated control lever, or movement of the lever beyond the calculated positions, or sudden acceleration or deceleration, often induce severe forces on the system to the point of overloading it, which not only may produce operator discomfort, but also reduces the efficiency of operation and increases the possibility of parts damage.

The invention eliminates these disadvantages by providing a variable length flexible connection between the operator controlled lever and the swash plate servo controls that accommodates the movements of the lever in the manner described above without transmitting overloads to the system.

Therefore, it is an object of the invention to provide a control system for operating valving that accommodates overtravel of a manually operated lever beyond positions corresponding to maxiumum and minimum movements of the valving without overloading the system.

It is a further object of the invention to provide in a hydrostatic transmission a flexible force transmitting means between an operator controlled drive ratio selector lever and a swash plate tilt angle servo control that limits the amount of force transmitted between the lever and servo control by accommodating overtravel of the lever beyond positions establishing predetermined operations of the transmission.

It is a still further object of the invention to provide a control of the type described having a variable length, and one that is self-adjusting so as to contract or expand at a predetermined loading on the servo control to prevent damage thereto.

Another object of the invention is to provide control valving in a hydrostatic transmission having variable displacement swash type pumps and motors wherein the valves for carrying the angle of the pump and motor swash plates, and therefore their displacements, operate in series, in one embodiment, to control the flow of fluid from a fixed displacement pump; or, in another embodiment, are operated in parallel to control the fluid from the transmission or from a make-up pump.

It is a still further object of the invention to provide, in a transmission of the type described, control valving regulating the flow of fluid to the servos from the transmission or a make-up pump.

Other objects, features and advantages of the invention will become apparent upon reference to the succeeding, detailed description thereof, and to the drawings illustrating the preferred embodiments thereof, wherein;

FIGURE 1 is a side elevational view of transmission embodying the control means of the invention;

FIGURE 2 is a top plan view of the transmission of FIGURE 1;

Figure 3A:
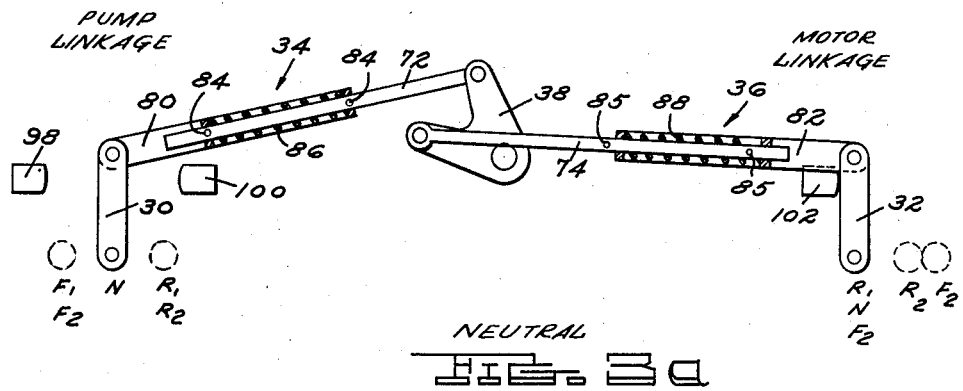

FIGURES 3a, 3b, 3c, 3d, and 3e are schematic illustrations of the control means of the invention in different operative positions;

FIGURE 4 is an enlarged cross-sectional view of the valving of FIGURE 1;

FIGURE 5 is a modification of the valving of FIGURE 4; and,

FIGURE 6 is an enlarged cross-sectional view of valving for use in connection with the transmission of FIGURES 1 through 5.

In general, FIGURE 1 shows a hydrostatic transmission 10 consisting of a variable displacement fluid pump 12 secured to a drive shaft 14 and fluid connected to a variable displacement fluid motor 16 secured to a driven shaft 18. The pump and motor are each of the swash plate type having tiltable plates 20 and 22 pivoted between maximum and minimum positions by hydraulic servos 24 and 26 to control the drive ratio between the pump and motor. The servos are operated by fluid under pressure as controlled by valves 30 and 32, the valves being connected through linkage means 34, 36, to a bell crank lever or cam 38. The cam is rotated by a manually operated transmission drive ratio selective lever 40.

Both the pump 12 and motor 14 are of a known type, the details of construction and operation of which are similar to those shown and described more clearly in United States Patent 3,107,490, "Control System For a Hydrostatic Transmission," Cooper, et al., issued October 22, 1963. These details are not repeated here since they are believed to be unnecessary for an understanding of the invention. Suffice it to say that variable tilting of the pump and motor swash plates 20 and 22 between predetermined maximum and minimum positions effects a drive of the motor in a known manner and at varying speeds in either a forward or reverse direction.

As shown in FIGURE 1, the pump swash plate is positioned for a neutral condition of operation providing a zero displacement of fluid to the motor 16, while the motor swash plate 22 is positioned for a maximum displacement. Variable tilting of the swash plate 20, in a manner and by means to be described, to the position indicated at 42, while maintaining swash plate 22 in the position shown, variably changes the displacement of the pump from zero to a maximum to effect a drive of the motor forwardly from a standstill to a medium speed. Further increases in speed of the motor up to a maximum is obtained by subsequently tilting the motor swash plate 22 to its minimum displacement position indicated at 44. Reverse operation is obtained by tilting of the pump swash plate 22 in the opposite direction from its neutral position to the position indicated at 46.

As best seen in FIGURES 1 and 2, the lever 40 is movable in infinite increments to opposite sides of a neutral or N transmission operation indicating position through a number of intermediate forward and reverse drive ratio positions $F_1$ and $R_1$ to fixed maximum forward and reverse positions F₂ and R₂. The lever forms one portion of a two piece bell crank 48 rotatably mounted about a fixed shaft 50. The other portion 52 has a ball joint connection with one end of a rack member 54 slidably mounted on a support 56 secured to the transmission housing. The rack member engages a pinion gear 58 fixed to one end of a shaft 60 rotatably mounted in a sleeve 62 secured in the support. The sleeve pivotally supports the ends of a pair of stationary piston rods 64 and 66 for the servos 24 and 26, respectively.

The servo valve actuating cam 38 is fixed to and extends at right angles to the pinion shaft 60, and comprises a bifurcated member having each arm portion pivotally connected by an adjustable means 68, 70 to force transmitting rods 72, 74. Each of the rods extends through the spaced ears 76, 78 of a substantially U-shaped second force transmitting member or link 80, 82, and has spaced lugs 84, 85 projecting therefrom to serve at times as seats for a compression spring 86, 88 surrounding the rod. The U-shaped links are pivotally secured to the different valves 30 and 32, which are slidably mounted in a valve body formed in the casings 90, 92 of the servos 24 and 26 (FIGURE 4). The casings in turn are pivotally secured to swash plates 20 and 22, as shown, and as controlled by valves 30 and 32, slide back and forth on stationary pistons 94 (FIGURE 4) received in cylindrical bores 96.

As described thus far, rotation of lever 40 rotates cam 38 through rack 54 and shaft 60, moving linkage 34, 36 and valves 30, 32 to actuate servos 24 and 26 to tilt the swash plates 20 and 22. The valves move between adjustable stops 98, 100 and 102. Any movement of lever 40 to positions which would normally slide the valves beyond these stops is accommodated by the variable length resilient connection between rods 72, 74 and links 80, 82, which connection will be described in more detail later.

FIGURE 4 shows one form of construction for both servos 24 and 26, FIGURE 5 showing an alternative construction. Referring to FIGURE 4, and using servo 24 as an example, the casing 90 is provided with a valve bore 110 in which the valve 30 slides, the valve having a number of spaced lands 112, 114, 116, 118, and 120 connected by neck portions of reduced diameter. The valve controls the flow of fluid under pressure from a supply line 122 and a branch line 124 to lines 126 and 128 leading to chambers 130 and 132 defined by the opposite sides of piston 94 and bore 96. The valve has a central bore 134 closed at both ends and connected by cross bores at all times to the annular chambers 136 and 138 defined by the space between lands 114 and 116, and 118 and 120. The chamber 138 is open at all times to an outlet line 140. The valve bore has an increased diameter at 142 and of a width greater than that of land 114 so as to constitute a fluid bypass.

In operation, with the valve positioned as shown in FIGURE 4 (by manual lever 40, FIGURE 1, and linkage 34), a fluid bypass condition exists. That is, lines 126, 128, and 124 are blocked, and fluid under pressure from line 122 passes around land 114 into bore 134 and out through passage 140. No movement of the cylinder or casing 90 occurs, and swash plate 20 remains in the neutral or zero displacement position shown in FIGURE 1.

Variable movement of the valve 30 to the left of the position shown in FIGURE 4 exhausts any fluid in piston chamber 132 through line 140, while admitting fluid from line 124 to chamber 130 to move casing 90 to the left to tilt the swash plate 20. Conversely, variable movement of the valve to the right of the position shown exhausts chamber 130 through bore 134 and line 140, while admitting fluid to chamber 132 to move casing 90 to the right. These three positions are illustrated in FIGURE 1 by the circles near swash plate 20 labelled F₁ F₂, N, and R₁ R₂. The three movements for the motor valve 32 are illustrated by the circles labelled R₁ N F₁, R₂, and F₂.

With this arrangement, the servos could be connected in series, and could be fed from a fixed displacement pump; i.e., the outlet through line 140 to the pump would be fed to the inlet to the motor servo.

FIGURE 5 shows an alternative valving arrangement for operating the servos in parallel by means of the fluid from the transmission or a separate make-up pump. The valve has four lands 144, 146, 148, and 150 connected by neck portions of reduced diameter, with a central bore 152 open to exhaust through land 150, and connected by cross bores to fluid chambers 154 and 156. A bore 158 receives the fluid under pressure for supplying the chamber 160 between lands 146 and 148 at all times. As shown, the valve is positioned in a neutral position blocking the flow to chambers 130' or 132'. Variable movement of the valve in either direction feeds fluid to one of the chambers, while exhausting the other by means of chambers 154 or 156 and bore 152, to tilt the swash plate 20 in one direction or the other.

FIGURE 6 shows a regulating valve arrangement for controlling the pressure of the fluid to the servos when supplied from either the transmission or a make-up pump. A valve body 160 has a transmission fluid supply passage 162 intersected by a branch passage 164 connected to a make-up pump and containing a one-way check valve 166. The fluid in passage 162 acts against the face of a piston valve 168 spring biased to a closed position. The piston is slidable in a chamber 170 for variably controlling the flow of fluid through a passage 172 leading to the servos, a metering orifice 174 providing a pressure drop on opposite sides of the piston. Upon supply of fluid from either source, the piston valve moves down to meter the flow of fluid through passage 172 until an equilibrium position is obtained providing a constant pressure level of the fluid in line 172.

The operation can best be understood by a consideration of FIGURES 3a through 3e, showing the variable length linkages, constructed according to the invention, in different operative positions. As stated previously, if the linkage dimensions are not absolutely correct, too rapid movement of the selector lever, even if the linkage dimensions are correct, or movement of the lever beyond the indicating positions establishing the predetermined tilt of the swash plates, would normally severely load the system and linkage so as to cause possible damage or malfunction to the transmission. The resilient linkages 34, 36 obviate these disadvantages by permitting overtravel movement of the cam 38 beyond positions placing the servo valves against the stops. Each of the force transmitting linkages consists of a U-shaped link and nested rod and spring, cooperating so as to be of a variable length, and can be extended or contracted, as needed, to permit the full pivotal movements of the pump and motor swash plates relative to each other and the cam 38.

In FIGURE 3a, the transmission is conditioned for neutral or no-drive, with the manual lever 40 in its N position (FIGURE 1). Because of the follow-up nature of the valves 30, 32, the valves move until they abut the stops 98, 100 or 102, and further movement of lever 40 and/or cam 38 is absorbed either in compression or tension by the links 34, 36. Thus, the positioning of lever 40 at N moves cam 38 to position pump valve 30 in the N or zero fluid displacement position, the spring 86 at this time having its normal or free length so as not to exert any force on the valve to move it out of this position. This same rotation of cam 38 initially moves motor valve 32 against stop 102, where the motor is conditioned for a maximum displacement (also neutral). Continued rotation of the cam to position pump valve 30 as shown is accommodated by the extension of link 36 upon compression of spring 88.

Figure 3B:
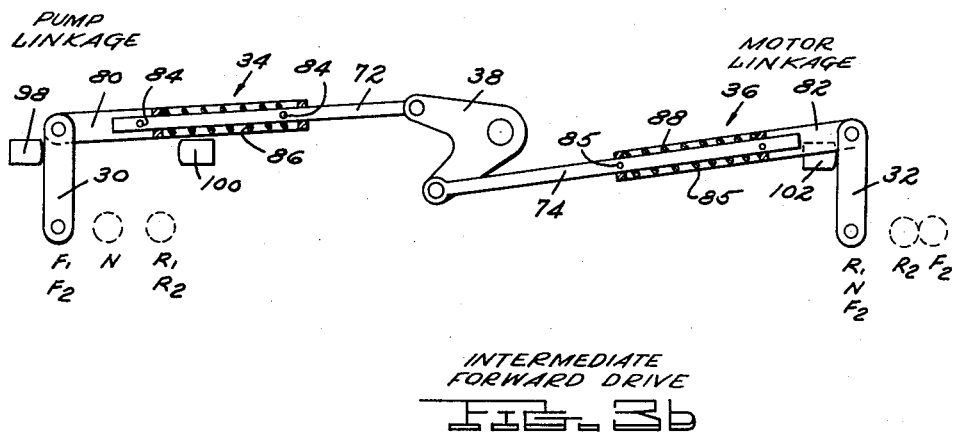

In FIGURE 3b, manual lever 40 has rotated cam 38 to condition the transmission for its intermediate or F₁ forward speed range by tilting the pump swash plate to its maximum angle, while maintaining the motor at the same displacement as before. In this instance, the link 36 and spring 88 has returned to its normal length, while cam 38 has moved valve 30 to its maximum position, and link 34 has been contracted by the compression of spring 86 to accommodate the overtravel of the cam beyond this position.

FIGURE 3c shows the cam 38 rotated by lever 40 to the maximum forward speed position $F_2$. In this condition, the pump and motor swash plates are conditioned for maximum and minimum displacements, respectively, with the link 34 being contracted slightly while link 36 is at its normal free length.

FIGURE 3d shows the arrangement when the manual lever 40 is moved to establish a first reverse drive range $R_1$. In this condition, both valves 30 and 32 are against stops 100 and 102, and both links 34 and 36 are at their normal lengths. The pump is conditioned for a maximum displacement in a reverse direction, while the motor is also conditioned for a maximum displacement.

Finally, FIGURE 3e shows the maximum reverse speed position. Here linkage 36 has moved motor valve 32 to the $R_2$ position and the link is at its normal length so as not to move the valve out of this position. Pump valve 30 meanwhile has remained in its $R_2$ position, but link 34 has been expanded to accommodate the overtravel of cam 38. The pump and motor are therefore conditioned for maximum and median displacements, respectively.

From the foregoing, therefore, it will be seen that the invention provides a variable length self-adjusting control linkage to permit proper sequencing of the pump and motor swash plate angles in accordance with the positions dictated by a manually controlled drive ratio selector lever, without transmitting overloads to the system. It will also be seen that this is accomplished in a simple manner, and overcomes the drawbacks normally imposed on such a system by design and manufacturing limitations.

While the invention has been illustrated for use in connection with a hydrostatic transmission control, it will be clear to those skilled in the arts to which the invention pertains, that it would have use in many other installations than that shown, and that many changes and modifications could be made, without departing from the scope of the invention.

I claim:

1. Control means for a variable displacement fluid pump having adjustable means for varying the fluid displacement settings of said pump, follow-up means opera- a plurality of positions indicative of different fluid displacement setting of said pump, follow-up means operatively connected between said adjustable means and said lever and movable to predetermined positions effecting adjustments of said adjustable means as scheduled by said lever, and resilient force transmitting means between said follow-up means and said lever, said resilient means being self-adjusting in length accommodating overtravel of said lever beyond positions placing said follow-up means in said predetermined positions.

2. Control means for a variable displacement fluid pump having adjustable means for varying the fluid displacement thereof, including, a control lever movable to a plurality of positions indicative of different fluid displacement settings of said pump, follow-up means operatively connected between said adjustable means and said lever and movable to predetermined positions effecting adjustments of said adjustable means as scheduled by said lever, and variable length push-pull force transmitting means between said follow-up means and said lever accommodating overtravel of said lever beyond positions placing said follow-up means in said predetermined positions.

3. A fluid pressure operated servo system, including servo means, conduit means connected to said servo means and containing fluid under pressure, valve means in said conduit means movable to predetermined positions for directing the fluid to different portions of said servo means, other means for moving said valve means, and extendable force transmitting means between said other means and said valve means accommodating overtravel of said other means beyond positions placing said valve means in said predetermined positions.

4. Control means for a variable displacement fluid pump having movable means for varying the fluid displacements of said pump, said control means including fluid pressure operated servo means for moving said movable means, valve means movable to predetermined positions for controlling the flow of fluid to different portions of said servo means to operate the same, other means for moving said valve means, and expandable-contractible force transmitting means between said other means and said valve means accommodating overtravel of said other means beyond positions placing said valve means in said predetermined positions.

5. Control means for a variable displacement hydrostatic swash plate pump, said control means including fluid pressure operated servo means for moving said swash plate, said servo means including a cylinder and a piston therein, said cylinder being connected to said swash plate and reciprocated by fluid under pressure acting thereagainst on opposite sides of said piston, fluid conduit means connected to said servo means and containing fluid under pressure, valve means in said conduit means movable to predetermined positions directing the fluid to opposite sides of said piston, a movable control lever for moving said valve means, and expandable linkage means between said lever and said valve means accommodating overtravel of said lever beyond positions placing said valve means in said predetermined positions.

6. Control means for a variable displacement hydrostatic swash plate pump, said control means including fluid pressure operated servo means for moving said swash plate, said servo means including a cylinder and a piston therein, said cylinder being connected to said swash plate and reciprocated by fluid under pressure acting thereagainst on opposite sides of said piston, fluid conduit means connected to said servo means and containing fluid under pressure, valve means in said conduit means movable to predetermined positions directing the fluid to opposite sides of said piston, a movable control lever for moving said valve means, and expandable linkage means between said lever and said valve means accommodating overtravel of said lever beyond positions placing said valve means in said predetermined positions, said linkage means comprising a pair of telescopically mounted links slidable relative to each other, and spring means engaging portions of each of said links biasing said links apart.

7. A hydrostatic transmission having fluid pump and motor units interconnected by a closed fluid circuit for the fluid drive of one by the other, each of said units having movable means for varying the fluid displacements thereof, control means including a separate fluid pressure operated servo means connected to each movable means for moving the same to vary the drive through said transmission, valve means associated with each of said servo means and movable to predetermined positions for controlling the flow of fluid to different portions of said servo means to operate the same, other means common to both of said valve means for moving said valve means, and expandable-contractible force transmitting means between said other means and each of said valve means accommodating overtravel of said other means beyond positions placing the different valve means in said predetermined positions.

8. A hydrostatic transmission having a variable displacement fluid pump and a variable displacement fluid motor interconnected for a drive therebetween, movable means for varying the fluid displacements of said pump and motor to vary the drive therebetween, and control means for controlling the movement of said movable means, said control means including a fluid pressure operated servo means connected to each of said movable means and movable to a plurality of operative positions, conduit means connecting fluid under pressure to said servo means, movable valve means in said conduit means for controlling the flow of fluid to operate said servo means, stop means preventing movement of said valve means beyond predetermined positions effecting adjustments of said movable means by said servo means, manually operated means common to both of said servo means and controlling the movement of said valve means, and expandable force transmitting means between said manually operated means and said valve means accommodating overtravel of said manually operated means beyond positions moving said valve means against said stop means.

9. A hydrostatic transmission having a variable displacement swash plate type fluid pump and motor interconnected for a drive therebetween, and control means for controlling the movement of said swash plates to vary the displacements of said pump and motor, said control means including fluid pressure operated servo means connected to each of said movable means and movable to a plurality of operative positions to vary the drive between said pump and motor, conduit means connecting fluid under pressure to each of said servo means, movable valve means in each of said conduit means for controlling the flow of fluid to operate said servo means, stop means preventing movement of each of said valve means beyond positions effecting predetermined adjustments of said servo means, manually operated means common to both of said valve means and connected thereto for controlling the movement of said valve means, and expandable-contractible push-pull force transmitting means between said manually operated means and each of said valve means accommodating overtravel of said manually operated means beyond positions moving said valve means against said stop means.

10. A hydrostatic transmission having a variable displacement swash plate type pump and motor interconnected for a variable number of drive ratios therebetween, and control means for controlling the movement of said swash plates to vary the displacements of said pump and motor, said control means including fluid pressure operated servo means connected to each of said movable means and movable to a plurality of operative positions, conduit means connecting fluid under pressure to each of said servo means, movable valve means in each of said conduit means for controlling the flow of fluid to operate said servo means, stop means preventing movement of each of said valve means beyond positions effecting predetermined adjustments of said servo means, a manually operated transmission drive ratio control lever means common to both of said valve means and connected thereto for controlling the movement of said valve means, and expandable-contractible push-pull linkage means between said manually operated means and each of said valve means accommodating overtravel of said manually operated means beyond positions moving either or both of said valve means against said stop means, said linkage means comprising a pair of telescopically mounted links slidable relative to each other, and spring means engaging portions of each of said links biasing said links apart.

11. Control means for a hydrostatic fluid drive assembly having fluid pump and motor units interconnected by a closed fluid circuit for the fluid drive of one by the other, one of said units having adjustable means for varying the fluid displacement of said one unit to vary the drive through said assembly, said control means including a control lever movable to a plurality of predetermined positions each indicative of a predetermined condition of adjustment of the fluid displacement of said one unit, follow-up means operatively connected between said adjustable means and said lever and movable to predetermined positions effecting the predetermined adjustments of said adjustable means as scheduled by said lever, and resilient force transmitting means between said follow-up means and said lever, said resilient means being self-adjusting in length accommodating over-travel of said lever beyond positions placing said follow-up means in said predetermined positions.

12. A transmission as in claim 10, wherein said lever means includes a rotatable bell crank member having spaced arm portions each connected to a different one of said linkage means.

No references cited.

UNITED STATES PATENT OFFICE
CERTIFICATE OF CORRECTION

Patent No. 3,157,998  November 24, 1964

Dennis Harris

It is hereby certified that error appears in the above numbered patent requiring correction and that the said Letters Patent should read as corrected below.

Column 4, line 41, after "lever," insert -- or --; line 42, after "correct," strike out "or"; column 5, line 49, strike out "settings of said pump follow-up means opera-" and insert instead -- thereof, including, a control lever movable to --.

Signed and sealed this 4th day of May 1965.

(SEAL)
Attest:

ERNEST W. SWIDER
Attesting Officer

EDWARD J. BRENNER
Commissioner of Patents